United States Patent [19]

McCann

[11] 4,364,337
[45] Dec. 21, 1982

[54] AUTOMOTIVE ONBOARD FUEL PRODUCTION SYSTEM

[76] Inventor: Frederick McCann, 9848 Ridgewood Dr., Twinsburg, Ohio 44087

[21] Appl. No.: 175,138

[22] Filed: Aug. 4, 1980

[51] Int. Cl.³ .................... F02B 75/12; F02B 43/08
[52] U.S. Cl. .................................. 123/3; 123/1 A; 202/83
[58] Field of Search ............... 123/1 A, 3; 202/83

[56] References Cited

U.S. PATENT DOCUMENTS

| | | |
|---|---|---|
| 1,716,084 | 6/1929 | Percy . |
| 1,716,084 | 6/1929 | Percy .................................. 123/3 |
| 3,447,511 | 6/1969 | Beard et al. ........................ 123/3 |
| 3,972,811 | 8/1976 | Larkins, Jr. et al. .............. 210/71 |
| 3,972,811 | 8/1976 | Larkins .............................. 123/3 |
| 3,985,108 | 10/1976 | Matsumoto ........................ 123/3 |
| 4,016,836 | 4/1977 | MacKay ............................. 123/3 |
| 4,033,307 | 7/1977 | John .................................. 123/575 |
| 4,170,200 | 10/1979 | Takeuchi ........................... 123/1 A |

OTHER PUBLICATIONS

Newspaper Article from the Cleveland Plain Dealer-4/1/80 entitled "Brazil's Alcohol-Powered Cars on Sale".
Newspaper Article from the Cleveland Plain Dealer-4/1/80 entitled "Gasohol called Milestone for Farmer".

*Primary Examiner*—Ronald B. Cox
*Attorney, Agent, or Firm*—Meyer, Tilberry & Body

[57] ABSTRACT

A system for distilling alcohol from mash onboard a motor vehicle is provided. The system uses the waste heat normally exchanged to the atmosphere by a vehicle radiator to drive a two-stage distillation process and uses the velocity of the vehicle to provide moving air to condensors liquefying the alcohol.

7 Claims, 2 Drawing Figures

AUTOMOTIVE ONBOARD FUEL PRODUCTION SYSTEM

The present application relates to a fuel system for automobiles using internal combustion engines and more particularly to a distillation system producing alcohol fuel for an internal combustion engine onboard the vehicle.

The invention is particularly applicable to the production of alcohol fuel from agricultural products or by-products in a passenger car and will be described with reference thereto; however, it should be appreciated that the invention has broader applications and may be used in other transportation systems such as watercraft.

BACKGROUND OF THE INVENTION

Currently available automobiles, trucks, watercraft and other forms of transportation rely almost entirely on petroleum products as a fuel source. Recent price increases and availability difficulties have made other fuel sources desirable and the search for these sources more economically feasible. As the price of petroleum increases, other sources of fuel will become economically more attractive.

Some attempts have been made to provide onboard fuel production or fuel supplementing facilities for motor vehicles in the past. Exemplary systems are described in U.S. Pat. Nos. 1,716,084 to Percy and 3,972,811 to Larkins et al.

U.S. Pat. No. 1,716,084 to Percy describes a vehicle mounted furnace burning charcoal or the like in the presence of air and water to produce a combustible gas as fuel for an internal combustion engine. The use of solid fuels in a furnace such as Percy presents significant problems of feed stock distribution and pollution control in today's world.

U.S. Pat. No. 3,972,811 to Larkins et al describes an apparatus for converting human waste into a combustible gas for supplementing gasoline or diesel fuel in an internal combustion engine. The primary fuel remains a petroleum product.

Some fuel production systems integrated into internal combustion systems have been used in stationary applications such as those producing power for use at petroleum well heads. U.S. Pat. No. 3,477,511 to Beard et al describes such a system using heat from an internal combustion engine to continuously refine a portion of the petroleum pumped at a well into a usable fuel. The refined petroleum is used to drive the internal combustion engine. The system is not suitable for use in a mobile application.

Alcohol has been used for sometime as a supplement in some fuel systems and has been produced commercially through distillation for a number of other uses. However, the use of alcohol as a motor fuel in internal combustion engines has only recently been considered as an alternative to, instead of a supplement to, petroleum products. As conventionally used, alcohol is produced through distillation of mash at large, commercial facilities and provided at stations to automobiles in a manner similar to the distribution of gasoline. Heat is needed in the distillation process requiring the consumption of fuel for this process heat.

SUMMARY OF THE INVENTION

In accordance with the present invention, a system is provided for converting mash having alcoholic content below that necessary for use as a motor fuel into alcohol of sufficient purity for use as a motor fuel onboard a vehicle using waste heat from the vehicle's internal combustion engine to drive a distillation process producing the fuel.

Further in accordance with the invention, a two-stage system is used to distill the alcohol resulting in a higher concentration of alcohol and thus a better motor fuel.

Yet further in accordance with the present invention, the vehicles motion and/or air flow generated by the vehicle fan is used to provide a moving air stream to cool condensors in the distillation apparatus.

Still further in accordance with the present invention, control and monitoring systems are provided allowing the system to automatically measure the time a batch of mash is heated to distillation temperature to provide complete alcohol extraction prior to discarding the exhausted mash and restarting the process, such that distillation can take place in an intermittently used automobile with optimum efficiency.

It is the primary object of the present invention to provide a system supplying alcohol as fuel to an internal combustion engine onboard a vehicle using waste heat from the internal combustion engine to distill the alcohol from mash.

It is another object of the invention to provide alcohol of superior purity and concentration as a fuel to an internal combustion engine through an onboard distillation system.

It is yet another object of the present invention to provide an alcohol production system onboard a vehicle which does not require a special source of coolant for direct cooling of condensors thereby providing economical distillation of alcohol from mash.

It is yet another object of the present invention to provide an automotive system using fermented agricultural products or by-products as an energy source.

It is still another object of the present invention to provide a vehicle fuel system using fermented mash in a two-stage distillation process which is easily maintained, controlled and integrated into existing automotive drive systems.

These and other features and objects of the present invention will become readily apparent from the following description of the preferred embodiment.

The invention may take physical form in certain parts and arrangements of parts, a preferred embodiment of which will be described in detail in this specification and illustrated in the accompanying drawings which form a part hereof and wherein.

Figure 1:
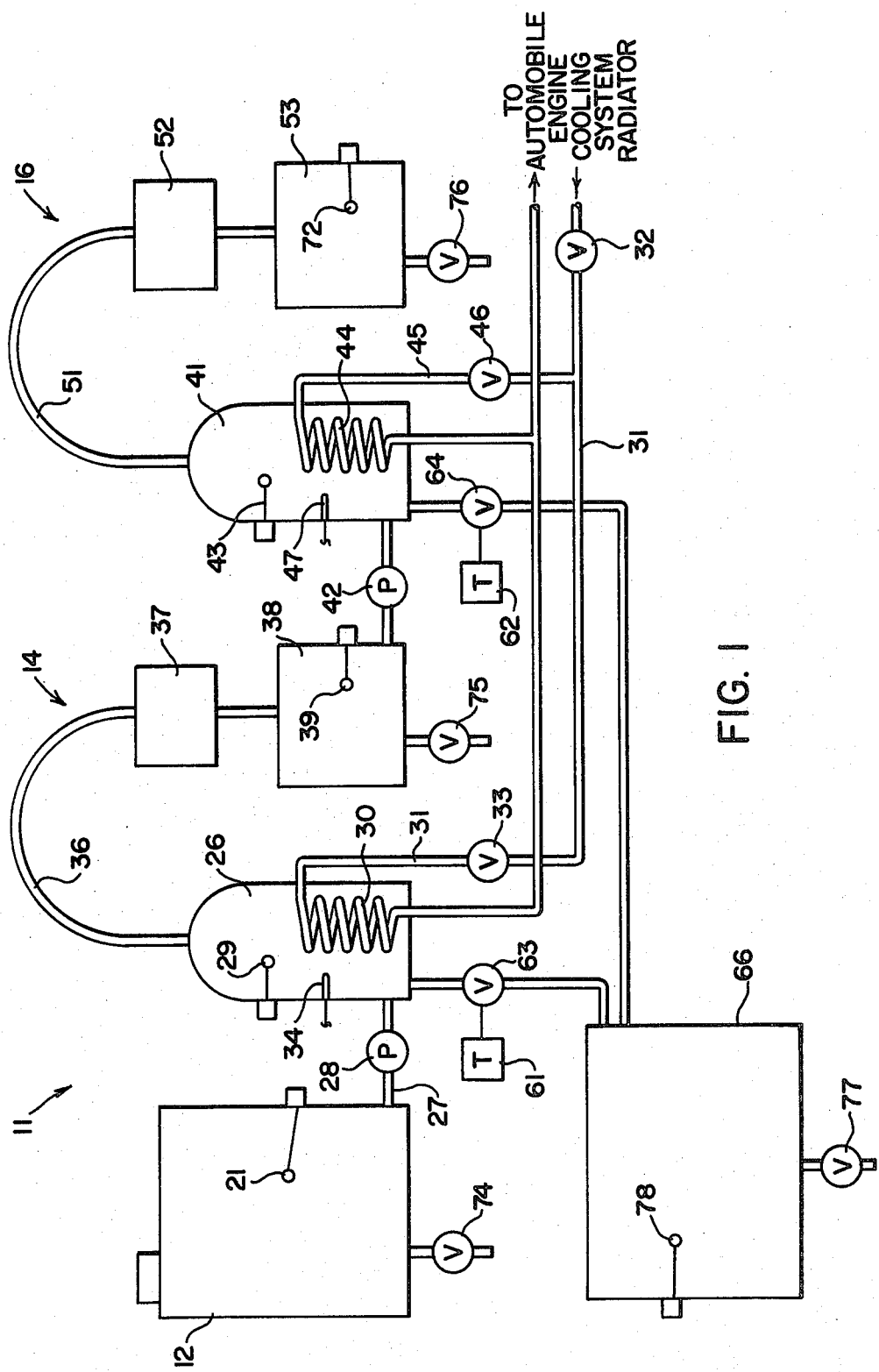
FIG. 1 shows the fuel system of the present invention in schematic form.

Referring now to FIG. 1 an alcohol production system 11 is illustrated having a mash storage tank 12, a first distillation stage 14 and a second distillation stage 16. Mash storage tank 12 can be comprised of a number of storage tanks disposed about the periphery of the automobile as these tanks will contain a low alcohol content liquid mash which is not flammable. Therefore, these tanks can be built into fender members, quarter panels or other body components of an automobile which are subject to collison risk without the high risk of fire or explosion present in gasoline storage tanks.

Mash storage tank 12 is provided with a float gauge 21 which measures the amount of mash contained in the tank and transmits this information to a reading unit disposed in the passenger compartment of the automobile (not shown).

Mash storage tank 12 is connected to a first distillation vessel 26 by means of conduit 27 and pump 28. First distillation vessel 26 also contains a float gauge 29 which monitors the level of mash in the first distillation vessel. Distillation is started by pump 28 filling first distillation vessel 26. Heat driving the distillation process is supplied through coil or heat exchanger 30 which receives automotive coolant from the engine cooling system through conduit 31.

Figure 2:
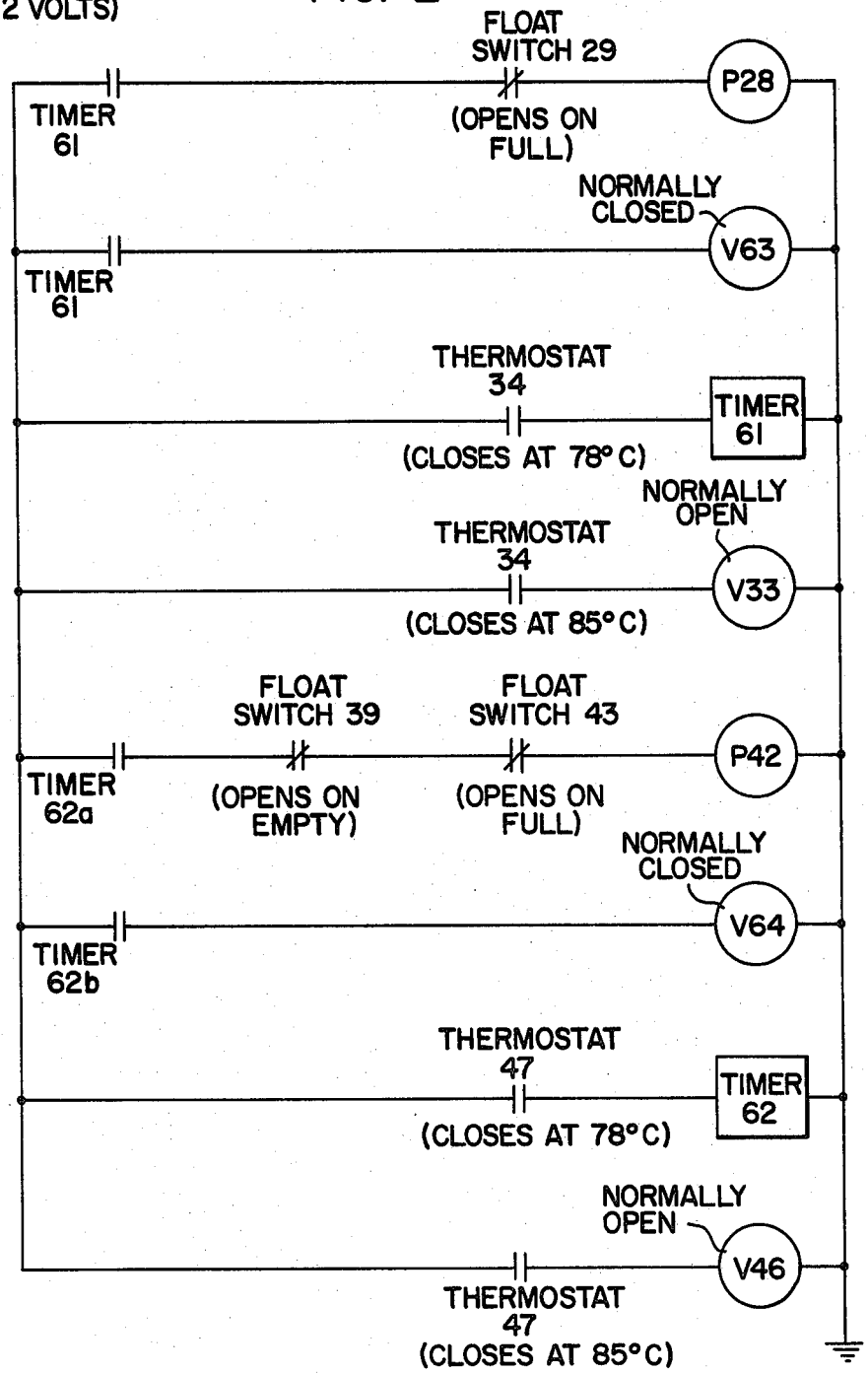
FIG. 2 shows a relay logic diagram of the controls used in FIG. 1.

As the principle fuel product to be distilled in this process is ethanol having a boiling point of 78.32° C., the automotive engine coolant having a normal temperature near 100° C. is an ideal heat source. It is sufficiently hot to vaporize ethanol while being easily controlled to maintain the temperature within the distillation vessel below the boiling point of water, the other major component of the mash forming raw material in the distillation process. Engine coolant can be drawn from the engine cooling system at the point of entry to the radiator or the point where coolant is discharged from the radiator, depending on the type of coil 30 used and distillation temperature desired. Either connection is easily made at the hose connections to the automotive radiator. A thermostatic valve 32 is provided in conduit 31 to prevent the flow of cooling fluid prior to the automobile engine reaching proper operating temperature. Once proper operating temperature is reached, the cooling fluid will exceed the thermostats temperature setting and the thermostatic valve 32 will open. Solenoid valve 33 is also disposed in conduit 31 to control flow to coil 30. Solenoid valve 33 is controlled by thermostat 34 disposed within first distillation vessel 26. Thermostat 34 can be a thermostat, thermocouple or thermister with appropriate supporting circuitry. As shown in FIG. 2, it has two sets of normally open contacts closing at 78° C. and 85° C. The 85° C. contacts prevent heat exchanger 30 from raising the temperature of distillation vessel 26 above 85° C. by shutting off the flow of coolant through valve 33.

The alcohol vapor output exits from the top of first distillation vessel 26 through conduit 36 which conducts the vapor to condensor 37 disposed within the engine compartment of the automobile to be in the air flow caused by the automobiles movement or the cooling fan. Condensor 37 can be of a similar construction to an automotive radiator but need not be as large. The amount of heat exchange needed for condensation of the alcohol is not as great as the cooling needs of the automobile engine.

The liquid alcohol output of condensor 37 is accumulated in first run holding tank 38. Float switch 39 monitors the liquid level in holding tank 38 and prevents emptying of this tank.

Alcohol solution is delivered to second distillation vessel 41 by pump 42 at the beginning of each distillation cycle. Float gauge 43 monitors the liquid level in second distillation vessel 41. Coil 44 provides the heat drive necessary for the distillation process in second distillation stage 16 in a manner identical to the first stage 14. Coolant is supplied through conduit 45 and controlled by solenoid valve 46 and thermostat 47 to maintain proper temperature. The output vapor of the second distillation vessel 41 exits the top of the vessel through conduit 51 and is condensed in condensor 52 into liquid alcohol for storage in fuel tank 53 and later use by the automobile's internal combustion engine. It is a twice distilled, high concentration alcohol fuel.

The above system operates in a batch mode controlled by cycle timers 61 and 62. The two stages cycle independently of one another but in a similar fashion. A cycle of the second distillation stage 16 will be described. The cycle is equally applicable to the first distillation stage 14.

At the start of the cycle, second distillation vessel 41 is empty. Cycle timer 62 closes its first normally open contact 62a which energizes pump 42 filling distillation vessel 41. Contacts associated with float switches 39 and 43 prevent overfilling of vessel 41 or drawing from an empty first run holding tank 38. Heat is supplied through heat exchanger 44 for the period selected for optimum alcohol extraction and set into cycle timer 62. If the vehicle is stopped or the engine cooling system cannot supply sufficient heat to drive distillation, the temperature in distillation vessel 41 will drop below 78° C. and thermostat 47 will stop timer 62 from proceeding through its cycle. When sufficient heat is again available timer 62 will resume operation and proceed through the remaining portion of its cycle. At this time, practically all alcohol will have been distilled from the charge in vessel 41, liquefied in condensor 52 and stored in tank 53. Cycle timer contact 62b will be closed, opening drain valve 64 directing the spent charge to holding tank 66. The cycle timer then restarts the cycle filling vessel 41 with a new charge.

Cycle timer 61 controls pump 28 and drain valve 63 in the first distillation stage in a similar manner.

If the vehicle is run for a period, turned off for a period and then started again, only the periods when distillation of alcohol is actually occuring are timed and counted as part of a distillation cycle.

As the original raw material filled into mash storage tank 21 is an alcohol solution made from fermentation of agricultural products or by-products, the spent mash in tank 66 is simply a cooked agricultural product. It does not contain the high level of complex pollutants normally found in petroleum products and can be disposed of very simply. It has a high organic content and can be used advantageously as fertilizer in home gardens or agriculturally and can therefore be disposed of without exotic environmental protection.

In the relay controlled embodiment described, cycle timers are used to control both the first distillation stage and the second distillation stage. These cycle timers provide good fuel production when dealing with a starting mash of uniform sugar content and alcohol content. The first and second stages 14 and 16 can be timed independently and practically all of the alcohol extracted.

A more efficient and versatile system uses a microprocessor digital control to precisely control distillation. With the use of a microprocessor the ability to manipulate the data representing the conditions of this complex process is vastly increased. Instead of just using a timer to govern the process, hydrometers can be added to each distillation vessel to monitor the alcohol content directly and temperature can be closely monitored thereby assuring maximum alcoholic extraction and maximum efficiency in the system. Further, the alcohol content of the mash can be combined with information on the capacity utilization of the system and system parameters to provide optimum cycling of both stages.

Each float switch 29, 39, 43 can also be provided with an indicator or gauge within the passenger compartment for the operators convenience. Additionally, float gauges 21, 72, 78 inform the operator of liquid levels in mash tank 12, fuel tanks 53 and holding tank 66 respectively. All of these gauges assist the operator in monitoring current status and reserve capacity of the fuel system. It is also advantageous to provide manual override switches for solenoid valves 63 and 64 to allow draining the system should impurities be introduced or should the operator for some other reason decide to restart the process. Stop cocks 74, 75, 76, 77 are provided in the mash storage tank 12, the first run holding tank 38, the fuel tank 53 and holding tank 66 to complete this draining apparatus.

The system can also be used in combination with a second fuel tank for gasoline. This is necessary in cars not properly equipped to run on pure alcohol and is also useful in other vehicles. Fuel from the alcohol fuel tank and the gasoline fuel tank can be mixed in a mixing or proportioning valve to produce gasahol of the desired character. This valve is made adjustable by the driver such that the mixture may be altered to meet driving and ambient conditions; e.g., richer in gasoline for starting on winter mornings. Of course, if a microprocessor system is used to control the distillation system, it can also be equipped with appropriate sensors and software to control alcohol-gasoline mixing automatically in response to driving and ambient conditions.

The invention has been described with reference to the preferred embodiment. Obviously, modifications and alterations will occur to others upon the reading and understanding of this specification. It is my intention to include all such modifications and alterations insofar as they come within the scope of the appended claims or the equivalence thereof.

Having thus described the invention, I claim:

1. In a motor vehicle having an internal combustion engine, the improvement comprising an onboard distillation system producing fuel for said internal combustion engine; said distillation system comprising a mash storage tank, a distillation vessel having a drain valve and a thermostat means sensing the temperature in said distillation vessel, a heat exchanger contained in said distillation vessel and receiving coolant from said internal combustion engine at an elevated temperature, said distillation vessel having a fuel vapor output port through which fuel vapor is delivered to a condensor means liquefying said fuel vapor, said condensor cooled by moving air, the liquid fuel output of said condensor being delivered to a fuel storage tank. Said drain valve being controlled by a cycle timer having a preselected cycle period, said timer being enabled whenever said thermostat means indicates the temperature in said distillation vessel exceeds a first preselected threshold, said cycle timer actuating said valve to empty said distillation vessel at the end of each cycle and resetting, allowing said vessel to be refilled and said cycle period to restart.

2. In a motor vehicle having an internal combustion engine cooled by a fluid engine coolant, the improvement comprising an onboard distillation system producing fuel for said internal combustion engine; said distillation system comprising a mash storage tank, a first distillation vessel, a first heat exchanger contained in said first distillation vessel and receiving coolant from said internal combustion engine at an elevated temperature, said first distillation vessel having a fuel vapor output port through which fuel vapor is delivered to a first condensor means liquefying said fuel vapor, the liquid fuel output of said first condensor being delivered to a first run holding tank, said first run holding tank supplying liquid fuel to a second distillation vessel, said second distillation vessel containing a second heat exchanger receiving coolant from said internal combustion engine at an elevated temperature, said second distillation vessel having a fuel vapor output port through which fuel vapor is delivered to a second condensor means liquefying said fuel vapor, the liquid fuel output of said second condensor being delivered to a fuel storage tank said first distillation vessel having a first drain valve and a first thermostat means sensing the temperature within said first distillation vessel, and said second distillation vessel having a second drain valve and a second thermostat means sensing the temperature within said second distillation vessel, said first drain valve being opened by a first cycle timer having a preselected first cycle period, said first cycle timer proceeding through its cycle only when said first thermostat indicates said first distillation vessel temperature exceeds a first preselected temperature, said second drain valve being opened by a second cycle timer having a preselected second cycle period, said second cycle timer proceeding through its cycle only when said second thermostat indicates said second distillation vessel exceeds a second preselected temperature.

3. The improvement of claim 1 wherein said thermostat means controls a coolant valve capable of stopping flow of coolant to said heat exchanger, said thermostat closing said valve whenever said thermostat means senses said distillation temperature exceeds a second preselected threshold.

4. The improvement of claim 3 wherein said moving air cooling said condensor is supplied by said vehicles motion through the atmosphere.

5. The improvement of claim 2 wherein said first and second condensors are disposed within the air flow created by said motor vehicle's motion whereby said condensors are air cooled by said air motion.

6. The improvement of claim 2 wherein said motor vehicle has a radiator and a fan moving air in a pathway about said radiator, and said first and second condensors are disposed within said moving air pathway produced by said fan.

7. The improvement of claim 2 wherein said distillation system includes a first coolant flow valve controlling coolant flow to said first distillation vessel and a second coolant flow valve controlling coolant flow to said second distillation vessel, said first thermostat means and said second thermostat means sensing temperature in the respective distillation vessels and preventing flow through the respective coolant valves when said temperatures exceed a third preselected temperature.

* * * * *